United States Patent [19]

Kotila

[11] 4,047,553
[45] Sept. 13, 1977

[54] TIRE CHANGING DEVICE

[76] Inventor: Wayne Kotila, 8317-28th Ave. North, Minneapolis, Minn. 55427

[21] Appl. No.: 466,267

[22] Filed: May 2, 1974

[51] Int. Cl.² .......................................... B60C 25/06
[52] U.S. Cl. .................................. 157/1.24; 157/1.28
[58] Field of Search .................... 157/1.24, 1.26, 1.28, 157/1.2

[56] References Cited

U.S. PATENT DOCUMENTS

| | | | |
|---|---|---|---|
| 2,661,793 | 12/1953 | Rockwell | 157/1.24 |
| 3,086,578 | 4/1963 | Breazeale et al. | 157/1.24 |
| 3,100,520 | 8/1963 | May et al. | 157/1.24 |
| 3,168,130 | 2/1965 | Turpin | 157/1.28 |
| 3,791,434 | 2/1974 | Duquesne | 157/1.24 |

Primary Examiner—Al Lawrence Smith
Assistant Examiner—James G. Smith
Attorney, Agent, or Firm—James R. Cwayna

[57] ABSTRACT

A tire changing device including a rotatable shaft with means for mounting rise rims thereon for the mounting and demounting of tires from rims which shaft is rotatably powdered and including a pair of vertically shiftable bead breaking units which will engage the tire from the upper side of the rim thereby breaking the bead as the tire is rotated and thereafter the lower of such pairs is brought upwardly to break the lower bead of the mounted tire and for demounting the lower member is brought further upwardly to remove the entire tire from the rim. The second lower pair of elements includes a pair of shaped disc members which will not only break the bead but will also force the tire from the rim. Power means are provided for moving the pair of elements vertically and positioning means are provided to shift these elements such that tires and rims of various sizes may be accommodated.

8 Claims, 18 Drawing Figures

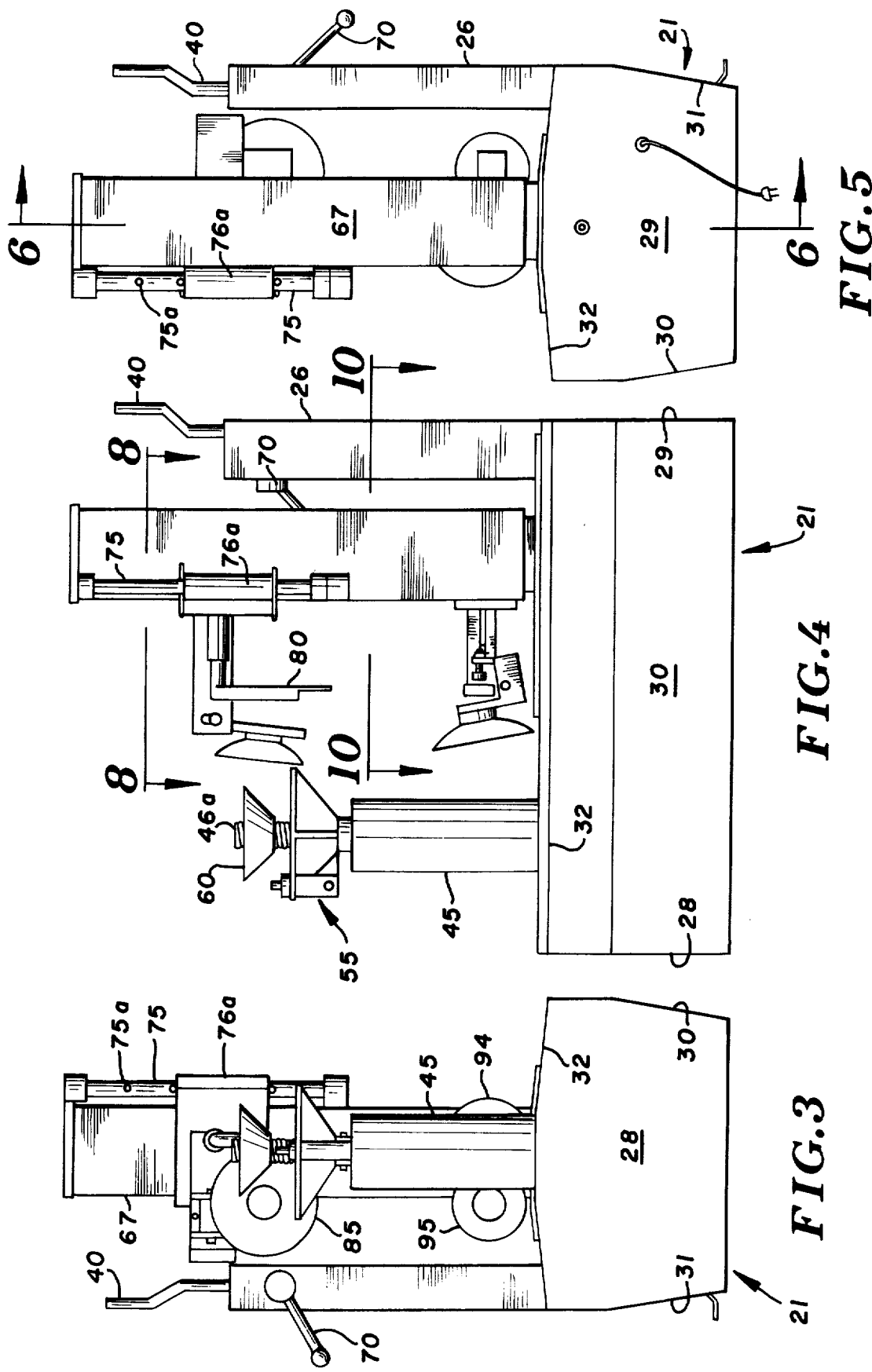

TIRE CHANGING DEVICE

Tire mounting and demounting has previously been done manually with tire tools and the like and has also been developed to include mechanical devices for breaking the bead of the tire from the rim and for removal of the same, but many of these mechanical concepts still include a high labor factor and are therefore relatively time consuming.

Applicant has provided herein a highly efficient, almost totally mechanical method for breaking the beads of tires from rims and for demounting and mounting tires on the rims such that the only practical manual labor required is the placement of the tire and rim upon the unit and the positioning of the various elements of the device in proper position to exert sufficient pressure upon the tire to break the same from the rim and to insure that such pressures will not be applied to the rim thereby causing damage thereto.

Applicant has provided herein a universal tire mounting and demounting unit which will accommodate a wide range of tire and rim sizes and which is capable of supplying sufficient force to remove the tire from the rim.

It is therefore an object of applicant's invention to provide a tire changing device which is mechanically operable and which requires a minimum amount of manual labor for the changing of tires.

It is a further object of applicant's invention to provide a tire changing device which is adaptable for receiving and changing tires from rims of various sizes and which is capable of supplying sufficient force for the breaking of beads of the tires and for removal of the tires from the rims.

It is a further object of applicant's invention to provide a tire changing unit which includes means for breaking the bead from both sides of the tire from the rim and for demounting the tire totally from the rim.

It is still a further object of applicant's invention to provide a tire changing unit which is capable of not only demounting the tire from the rim but also capable of remounting a tire on a rim with a minimum of manual labor.

It is a further object of applicant's invention to provide a tire changing device which includes an upper and lower bead breaking member such that the two respective beads of a tire may be broken and upon breaking of the lower bead of the tire may be demounted from its rim.

These and other objects and advantages of the invention will more fully appear from the following description made in connection with the accompanying drawings in which the same numeral is used to designate the same or similar parts throughout the several views, and in which:

FIG. 3 is a front elevation thereof;

FIG. 4 is a side elevation taken opposite the side illustrated in FIG. 2 of the invention;

FIG. 5 is a rear elevation view thereof;

Figure 1:
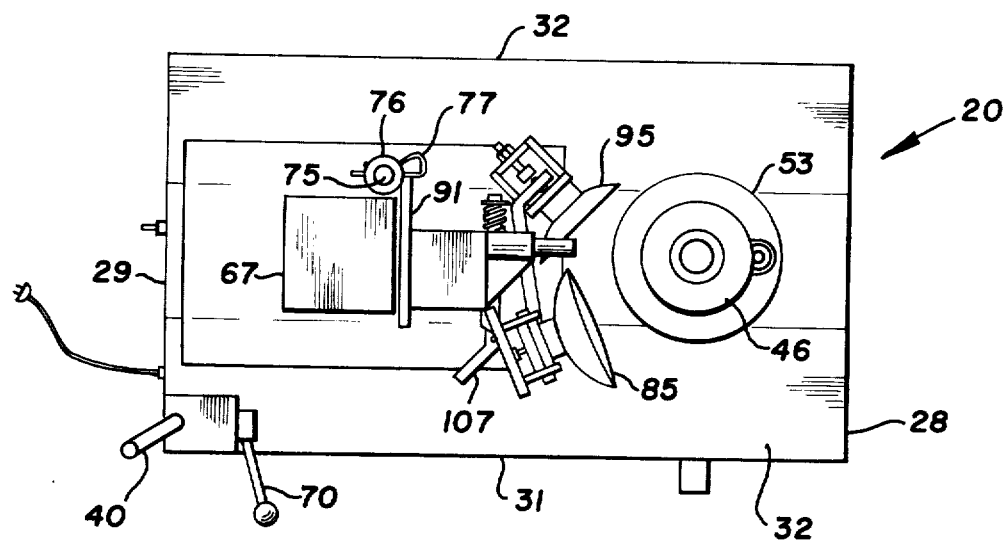
FIG. 1 is a top plan view of a tire changing unit embodying the concepts of applicant's invention.
Figure 2:
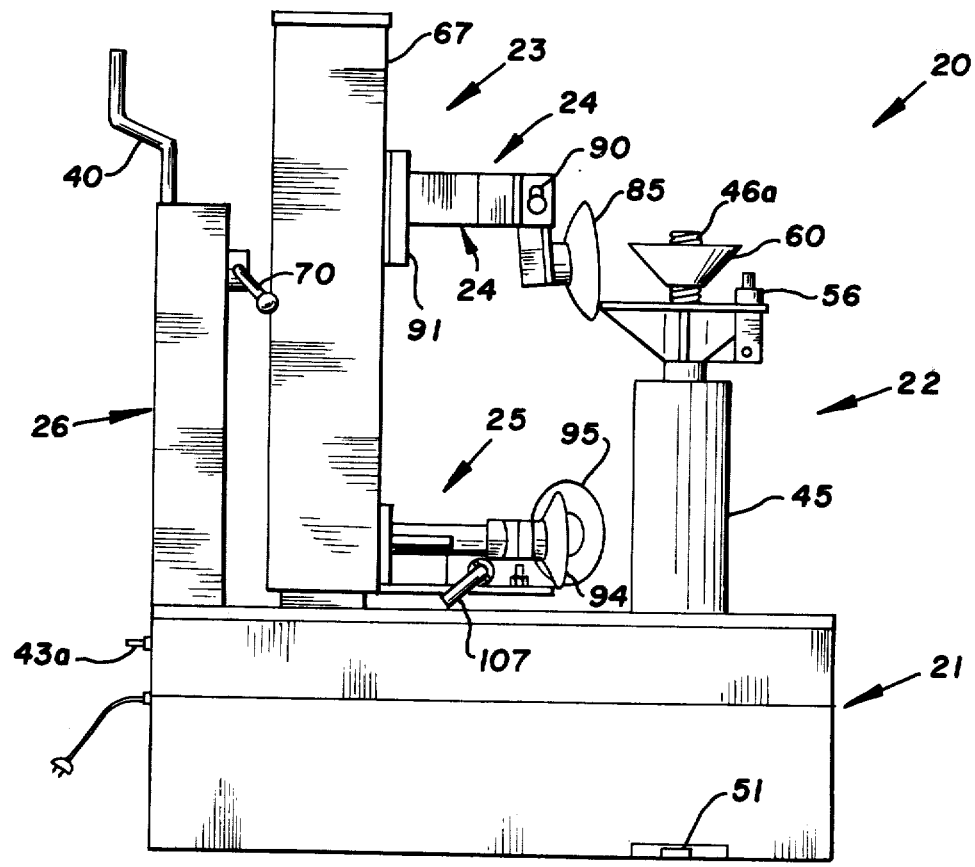
FIG. 2 is an elevation taken from one side of of applicant's device.

In accordance with the accompanying drawings, applicant's tire changing device is generally designated 20. The device includes many correlated operating elements and may be broken down initially into a base section 21, a rim and tire mounting section 22, a bead breaking section 23 which consists of both an upper 24 and a lower 25 bead breaking pair of elements and a control positioning station designated 26.

Figure 6:
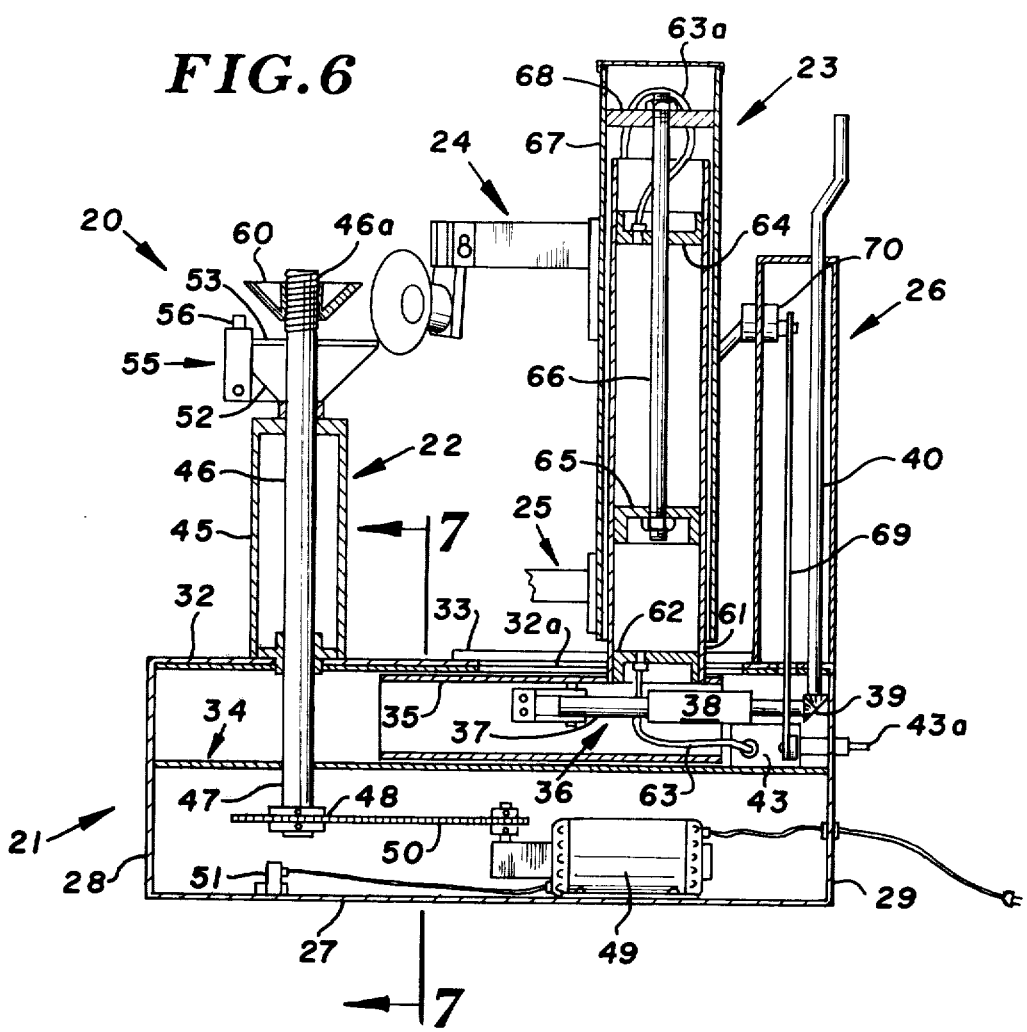
FIG. 6 is a vertical section taken generally centrally of the unit and substantially along Line 6—6 of FIG. 5.
Figure 7:
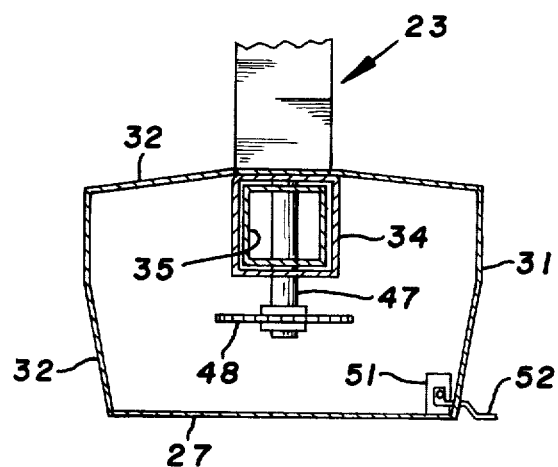
FIG. 7 is a vertical section taken substantially along the lines 7—7 of FIG. 6.

The basic concept of the application is to provide means for mounting and demounting tires from rims and obviously to provide a universal type device, means must be provided for adjusting the device to accommodate various sized tires and rims. A total cross section of the unit is illustrated in FIG. 6 and the various operative portions of the device are best illustrated therein.

The base structure 21 as utilized comprises a substantially rectangular housing having a bottom 27, ends 28, 29, sides 30, 31 and a top 32. The top 32 is provided with a slot 32a therein such that the bead breaking section 23 may be shifted longitudinally therealong and the slot 32a must obviously be of a size to accommodate the movement of this section 23 and this slot 32a may be covered with a flexible or movable closure element 33 such that dirt or the like will not pass therethrough.

Arranged within the base 21 is another longitudinally extending member which, in the form shown, provides a substantially square, track-guiding element 34. Arranged within this track-guiding element is a follower 35 member again being substantially square in shape or, it should be obvious, that these two elements may have any compatible shape to permit longitudinal travel of the inner member 35 within track 34.

The upwardly extending bead breaking section 23 is secured to one surface of the follower member 35 such that the same will travel therewith and means for advancing this inner follower member 35 are provided therewithin and this element is designated 36. This movement producing member includes, in the form shown, a first extensible member 37 arranged for attachment to the follower member 35 and this extensible member 37 is driven through a screw-type element 38 which is in turn driven through a pair of bevel gears 39 to permit a vertically upstanding handle member and shaft 40 to extend upwardly through the control portion 26 such that the bead breaking section 23 may be advanced through the guide channel 34 simply by manually revolving the crank and shaft 40. It should be obvious that upon such advancement the entire bead breaking assembly including the pair of bead breaking elements 24, 25 will move with respect to the tire mounting portion 22.

Also arranged within the base member 21 and relatively adjacent to the follower member 35 is an air valve mechanism 43 which is designed to receive air therein through an inlet 43a which will provide air to the bead breaker section 23 for elevation thereof. This will be further described when consideration is made of the bead breaker section 23.

Arranged below the track and follower mechanism, a driving mechanism is provided to provide rotation to the tire mounting assembly 22. In the form shown, and as best illustrated in FIG. 6, this assembly includes a housing 45 extending generally vertically upright from the upper surface 32 of the base 21 and a shaft member 46 is provided for rotation therein. This shaft member 46 must obviously be sealed and provided for rotation through bearing members on the various sections thereof and this shaft member 46 extends downwardly through the guiding track 34 into a lower portion of the housing as at 47 to provide a driving end having a sprocket 48 thereon. A motor 49 is provided in the lower portion of the housing 21 and a chain 50 or a similar connective member is provided between motor 49 and the sprocket 48 for positive driving thereof. A switch member 51 is provided to control the operation of the motor 49 and this switch member extends to an external controlling contact 52 which may be operated by the operator's foot exteriorly of the unit. Obviously when the switch is turned to its on position the motor will turn the shaft 47 and rotation of the shaft will occur along with the portions mounted thereon.

Figures 8, 9:
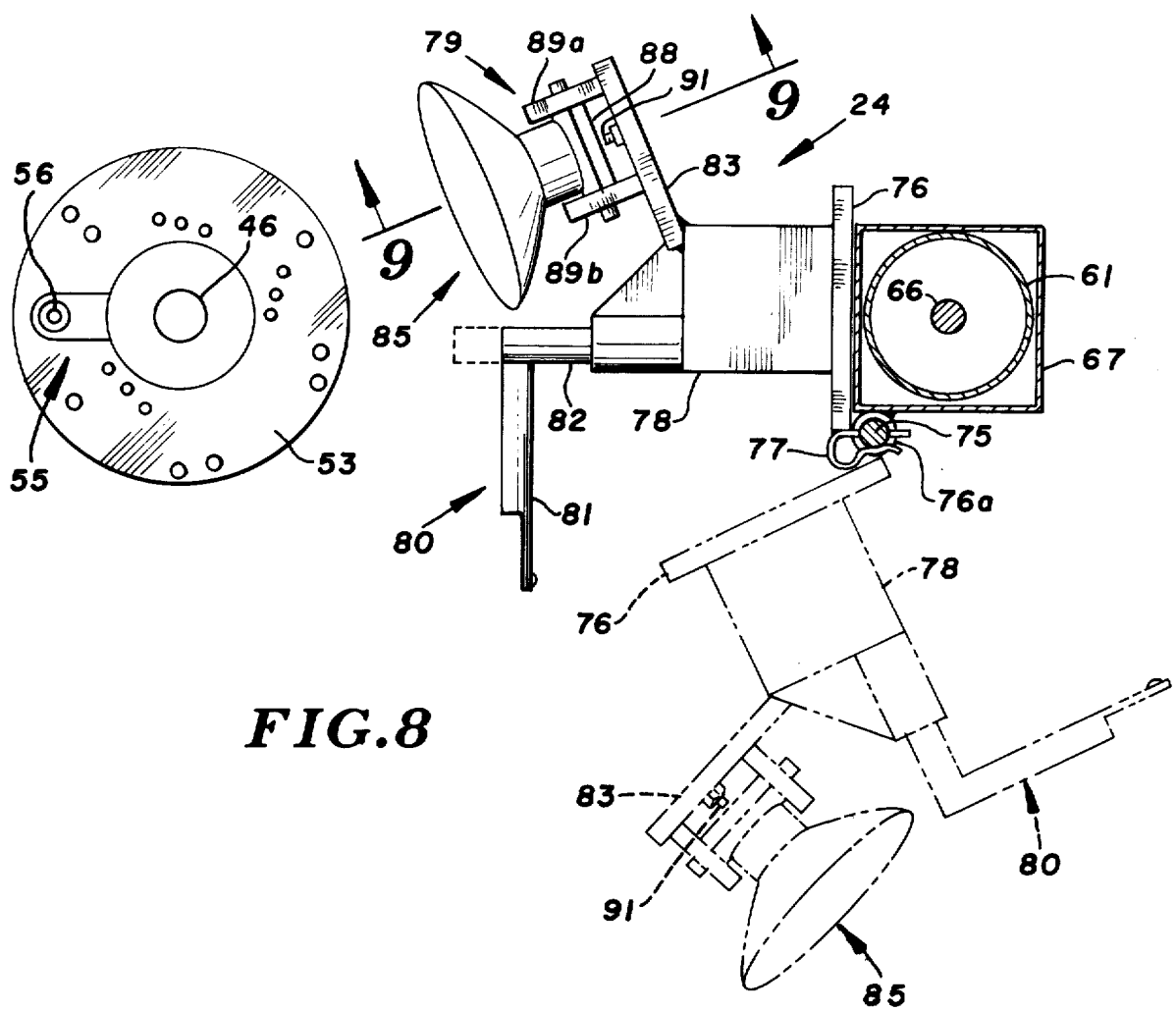
FIG. 8 is a horizontal section taken substantially along line 8—8 of FIG. 4 and illustrating certain elements of the invention in dotted line position to illustrate the possible positions thereof.
FIG. 9 is a section taken substantially along line 9—9 of FIG. 8 and again illustrating possible movements thereof in both solid and dotted line position.

Shaft 46 is provided with a first mounting member 52 having a generally flat upper surface 53 thereon which surface is particularly illustrated in FIG. 8 and which surface is provided with a plurality of bolt holes therein to accommodate rims of various sizes. The illustration in FIG. 8 illustrates a possible layout of such bolt holes to accommodate various size rims.

Arranged on the mounting member 52 is a driving member 55 which may be hingedly adapted to the mounting member 52 but which is also provided with a driving peg 56 extending generally upwardly therefrom such that the same will be in alignment with the bolt holes of normally sized tires and rims. This driving member 55 may be hingedly attached to the first mounting plate 52 and may be normally biased inwardly such that such driving force is maintained but the primary aspect of this device is to provide a member that will normally engage the lug holes on a standard rim.

The upper end of shaft 46 designated 46a is threaded and is designed to receive a rim capturing element 60 which is generally frusto conical in shape such that the same will normally adapt itself to and center the rim of a tire. The normal usage of these elements is to place the rim upon the surface 53 of the mounting member 52 and thereafter clamp the clamping member 60 downwardly upon threaded portion 46a of the shaft 46 with the driving member 56 being normally received through an aperture of the rim such that the rim will be tightened onto the shaft 46 and will be driven by the driving member 56.

In this manner then, it should be obvious that it is possible to mount a tire and rim upon the rotatable shaft 46 and to rotate the same for the various functions and various operations that will be performed thereon with the tire and rim being held in relatively horizontal position. With the bolt hole configuration, as suggested in the plan view of FIG. 8, it should be obvious that various rims may be accommodated thereon and that the same will be driven when the shaft 46 is rotated.

The bead breaking section 23 includes a first internal upright cylindrical portion 61 which is, as stated, secured to the track member 35 for movement therewith. A lower stationary air inlet portion 62 is defined in the lower end of such upright member 61 and this element includes an air flow line 63 extending air valve 43. Also arranged inwardly of the upright member 61 is an upper sealing member 64 having an air inlet line 63a passing therethrough such that pressurized air may be delivered from the air valve 43 to either end of this unit. Obviously this unit provides a cylinder with air available to either end thereof. Arranged for vertical movement within this cylinder is a piston member 65 which will obviously move in response to air being provided on opposite sides thereof and which is further connected to a shaft 66 which extends upwardly through the aforementioned closure plate 64 and which is attached to an external, vertically moving housing element 67 which surrounds the upstanding member 61 and which forms the carrying element for the bead breaking section 23. Obviously, upon vertical movement of this exterior housing 67, the bead breaking section 23 will be carried therealong for shifting thereof with respect to the tire and rim mounted upon the mounting plate surface 53. A control link 69 is provided to control the air valve 43 and this member is arranged in the control portion 26 and extends upwardly therein to a hand operative portion 70 at a height which will permit an ease of hand operation.

The control portion 26 basically houses the aforementioned link 40 to the advancement member 36 for moving the bead breaking assembly 23 forwardly and backwardly and also houses the air control mechanism 70 for the lifting and positioning of the exterior cylinder 67 about the interior vertical member 61 for the proper positioning of the pair of bead breaking elements 24, 25.

The bead breaking section 23 as thus far described includes the movable cover portion 67 controlled through the air valve 43 and the piston arrangement 65. Two bead breaking members 24, 25 are arranged thereon and the details of these members are best illustrated in FIGS. 8 - 12.

The upper bead breaking member 24 as illustrated in FIG. 8 provides a unit that is shiftable from a first operative to a second position where it will be completely removed from an overlying position over the tire to permit the tire to be removed from the rim. This shifting situation is provided by a hinge member including a shaft 75 attached to the movable cover member 67 which will move therewith and the breaking assembly 24 includes a plate 76 having a hinge receiving, longitudinally extending cylinder 76(a) attached thereto to be received about the aforementioned shaft 75 arranged on the cover member 67. This shaft 75 is provided with a plurality of apertures upwardly therealong designated 75a and locating hooks or pins 77 are provided for positioning the bracket plate 76 thereon. In this manner then, the entire bracket plate 76 may be swung into the dotted line position as illustrated in FIG. 8 such that the whole unit will be removable from an overlying position with respect to the tire.

An outwardly extending bracket 78 is provided for mounting the bead breaking disc 79 thereon and for also mounting a tire mounting tool 80 thereon.

Mounting tool 80 is telescopically received into the bracket 78 and normally provides a downwardly extending arm 81 from the telescoping section 82 which will, for mounting the tire, extend downwardly into the bead area of the tire and upon rotation of the tire will force the bead and therefore the tire around the rim. This member 80 is shiftable from a vertical to a horizontal position and the position in FIG. 8 is that of the horizontal position. Obviously locking means must be provided for holding this mounting arm 80 in such horizontal position and this may take many forms and is not illustrated herein.

The bead breaking member 79 is provided on an attachment arm 83, which attachment arm is arranged at an angular offset with respect to the bracket and applicant has found that in the best operation this attachment bracket should be offset at a 10° angle with respect to the front of the bracket. The actual bead breaking element 85 consists of dish-shaped member, the cross section of which is illustrated in FIG. 9, mounted for rotation upon a mounting shaft 86 which in turn is carried by an upwardly extending plate member 88 which plate is rotatably mounted between a pair of arms 89a, 89b which arms have an elongated slot 90 therein such that when the bead breaking member 85 is in a downward position as illustrated in FIG. 9, the same may be rotated out of tire contacting position but when upward pressure is applied to this bead breaking member the same will be shifted in the slot 90 upwardly such that the back of the plate 88 will abut with a set screw 91 carried by arm 85 and the same will not be allowed to rotate. Basically then this tire bead breaking element 85 may, when not being utilized to break the bead, be rotated out of position, preferably when the tire mounting arm 80 is being utilized, the upward force as being exerted by the tire against the same, will be forced upwardly and rotation thereof will not be allowed due to the abutment thereof with the pin 91. The attitude of the bead breaking unit is also offset with regard to a vertical position and the applicant has found that a 5° offset will provide the proper tire bead breaking force.

It should be noted that the dish shape of the bead breaking element will provide a smooth entrance for the element between the rim and the tire to thus break the bead of the tire as the tire is rotated on the tire mounting unit.

Figure 10:
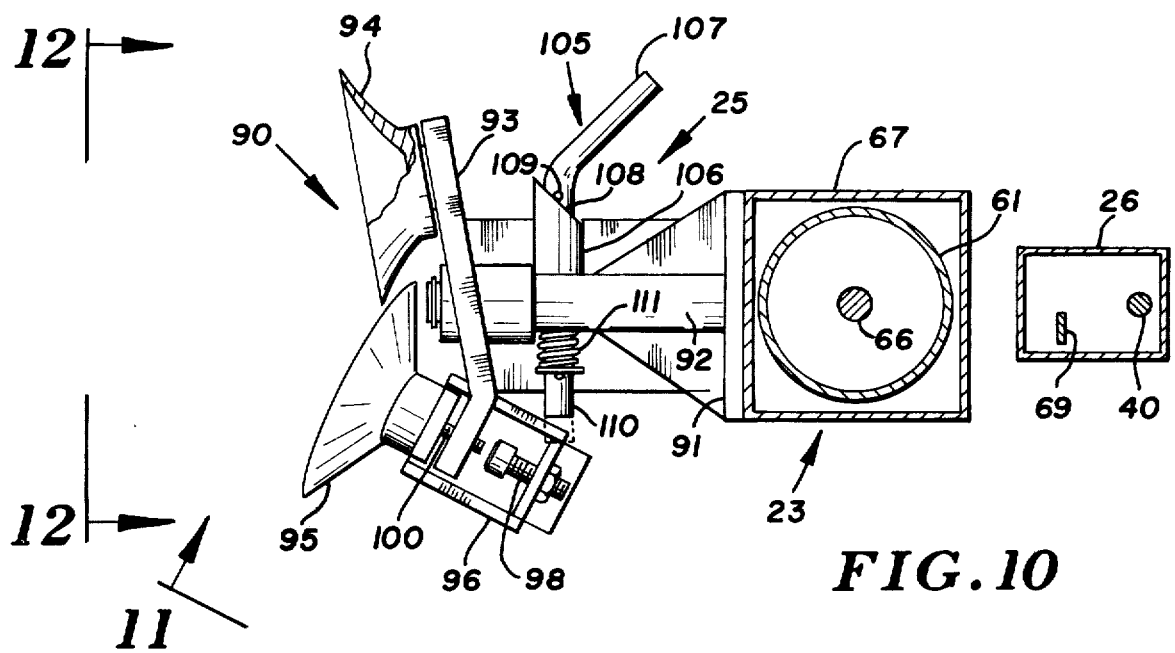
FIG. 10 is a horizontal section taken substantially along line 10—10 of FIG. 4.
Figure 11:
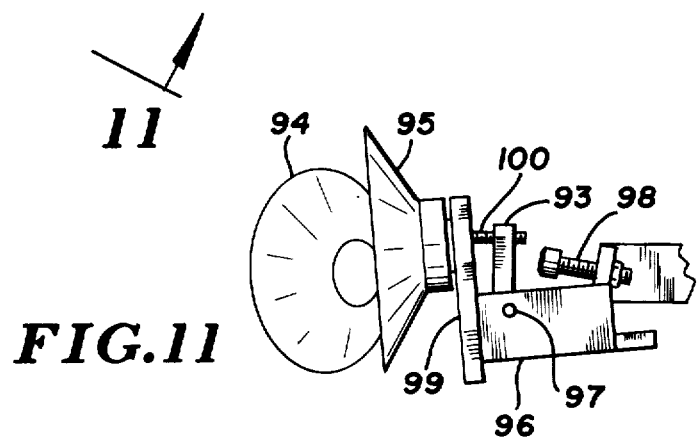
FIG. 11 is a view taken substantially along line 11—11 of FIG. 10.
Figure 12:
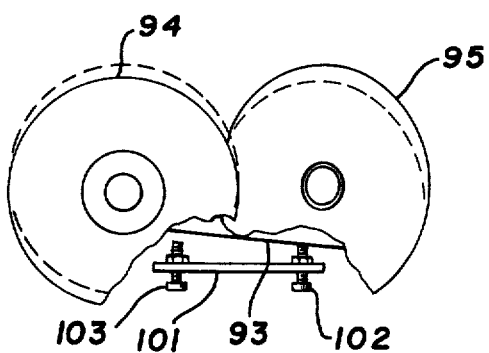
FIG. 12 is a view taken substantially along line 12—12 of FIG. 10 and again illustrating alternative positions of the elements by solid and dotted lines.

The lower bead breaking assembly is best illustrated in FIGS. 10, 11 and 12.

As illustrated herein the entire unit is designated 90 and includes a mounting plate 91 attachable to the exterior vertically shiftable cover 67 of the bead breaking section 23 and this mounting bracket 91 includes plate members that will extend the same forwardly from the vertically movable cover member 67. A shaft 92 is provided as one of these support members and the bead breaking assembly 90 is rotatably mounted thereon. This bead breaking assembly includes a mounting bar member 93 rotatably mounted on such shaft 92 which bar member is angularly offset with respect to the plane of the assembly 23 and the angularity between the ends of the bar provides approximately a 10° angle between a first, bead breaking, dish-shaped member 94 and the shaft 92 and approximately a 26° angle between the shaft 92 and a second, tire removal, dish-shaped member 95. The first bead breaking member 94 is mounted for rotation upon the arm 93 and the tire removal member 95 is rotatably mounted thereon but is also provided for a certain degree of oscillation about the arm 93 by providing a mounting bracket 96 therefore pivotally mounted through pin 97 onto the arm 93 and an adjustment stop member 98 is provided on the end of bracket 96 such that what may be termed a forward shifting of the member 95 will be controlled when this stop adjustable pin member 98 abuts with the rear of the arm 93. Although this is adjustable, the applicant has found that an angular shifting of approximately 13° is permissible and acceptable. The tire removal member 95 is rotatably mounted upon a second bracket 99 extending upwardly from the first bracket 96 and a stop pin 100 is positioned in the arm 93 to control what may be termed the rearward tilting of this member.

As previously stated, arm 93 is mounted for rotation about shaft 92 and this will permit the two members 94, 95 to be shifted into alternative positions. These alternative positions are illustrated in FIG. 12 and it should be noted that a control bar 101 is provided below the arm 93 with adjustment members 102, 103 thereon which will control the amount of tilting that is allowed in the arm 93 and therefore the amount of displacement of the two members 94, 95 about the shaft 92.

Control of this displacement is obtained through a cammed locking shaft unit designated 105 which includes a housing member 106 having a passage therethrough to receive a control arm 107 which mounting shaft 106 is provided with a camming surface 108 thereon and a pin member 109 is provided in the locking shaft 107 to control the extending end 110 thereof. The locking shaft 107 is normally biased into the direction of member 95 and particularly into the mounting bracket 96 thereof through a spring member 111 such that as the same is rotated, the biasing member 111 in cooperation with the camming surface 108 and pin member 109 will shift the end 110 into locking engagement with the bracket 96. In normal operation this shaft 107 will engage with and hold the arm 93 in the dotted line position of FIG. 12. Upon release or withdrawal of shaft 107 by rotating the same, bar 93 and the carried bead breaking and removal member thereon will be free to be shifted by pressure exerted thereon by the tire as this member is moved upwardly.

It should be noted that the angular relationship of the members 94, 95 are pre-determined and this aforementioned angularity of 10° and 26° places both of them in a position for not only proper bead breaking of the tire but in addition thereto for the removal of the tire from the rim when the same is moved upwardly. These two members do co-act in the removal of the tire from the rim and after the bead breaking operation the shaft 107 is shifted such that these same elements will be controlled by their movement upward into the tire and by the tire's force thereon.

The operation of the unit is illustrated in FIGS. 13 – 18. These illustrations simply are to show the normal operation of the device and numerals have been minimally used thereon.

Figure 13:
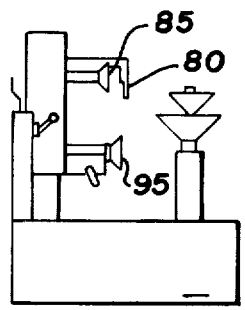
FIGS. 13 – 16 are schematic illustrations showing the device and the operation of the device for breaking the upper and lower beads of the tires from the rim.
Figure 14:
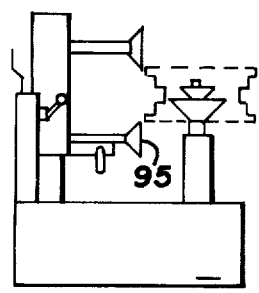
Figure 15:
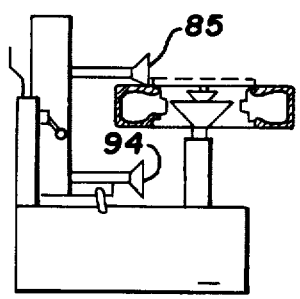

As illustrated therein, FIG. 13 is simply a side elevation of the unit prior to the placement of a tire and rim thereon. FIG. 14 illustrates the proper positioning of a tire rim thereon and the proper horizontal placement of the upper tire breaking element 85 is illustrated thereon to show that the same would be gapped slightly from the edge of the rim such that as the unit is moved downwardly as illustrated in FIG. 5 the bead breaking member 85 will miss the rim but through its slightly angular shifting situation which is made available as illustrated in FIGS. 8 and 9, the unit will slide below the upper bead of the tire and break the same from the rim. This particular upper bead breaking sequence is illustrated in FIG. 15.

Figure 16:
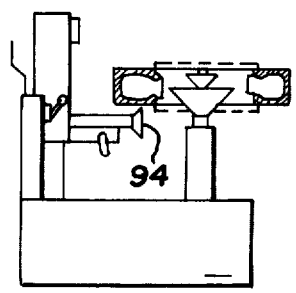
Figure 17:
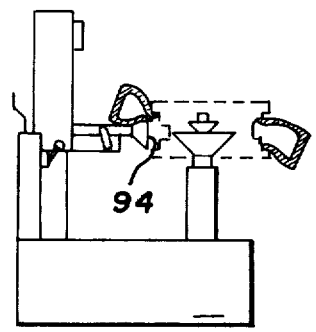
FIG. 17 is a schematic illustration showing the operation of the device for demounting a tire; and, FIG. 18 is a schematic illustration showing the device being utilized for mounting a tire to a rim.
Figure 18:
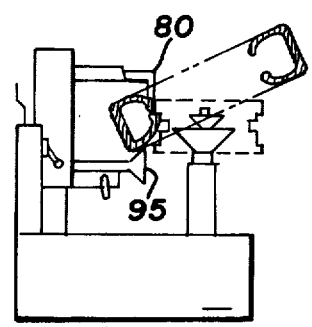

When the upper bead has been broken from the rim, the lower bead breaking system comes into operation and at this point the upper bead breaking member 85 has been shifted out of position from overlying relationship to the tire. At this point the lower breaking assembly comes into action and as stated, the member is locked through operation of the shift 107 such that the bead breaking member 94 will initially contact the tire for the bead breaking operation. After such bead breaking operation the shaft 107 is shifted into what may be termed an unlocked position and continued upward movement of the unit will now result in the co-action of members 94, 95 operating together for total removal of the tire from the rim. This particular sequence is illustrated in FIGS. 16 and 17.

In mounting a tire it is only necessary to place one side, which would be the upper and lower beads, around one edge of the tire and to now swing the upper unit into position over the tire and to properly place the mounting arm 80 within and between the bead of the tire and the tire rim. This member, as previously stated, may be held out of the way during the bead breaking assembly by shifting the same into its horizontal position but in this mounting situation it is shifted into its vertical position such that it will be between the bead and the rim and upon rotation of the tire this member 80 will force the tire around and down onto the rim.

Applicant has provided a device which substantially provides for minimal manual labor in the changing of a tire in that it is only necessary for the operator to position the rim and tire on the unit and properly clamp the same thereto and thereafter the device is automatically operated through controls to break the upper and lower beads of the tire and to completely remove the tire from the rim. The mounting operation is substantially the same in that it is only necessary to place the rim properly upon the unit and to start the tire around the rim and thereafter utilize the unit for complete mounting of the tire.

Applicant's device provides a relatively simple unit for mounting and demounting of tires and through the arrangement of the mounting plate as illustrated in FIG. 8, the unit is adaptable to various size tires. This adaptability is also achieved through the movable portions of the unit in that, although there are obvious limitations in the ultimate size of the tires that are being mounted and demounted, a wide variety of such sizes may be accommodated therein.

What I claim is:

1. Changing apparatus for tires mounted on drop center rims, comprising, in combination:
    a shaft and means for causing rotation of said shaft about a first axis;
    b. means for securing a drop center rim with a tire mounted thereon to said shaft for rotation therewith without axial movement therealong;
    c. a tool carriage;
    d. adjusting means operable to reversibly translate said carriage in opposite directions transverse to said first axis;
    e. feed means for reversibly translating said carriage in opposite directions parallel to said first axis;
    f. first and second spaced tool holder means fixed to said carriage and projecting toward said axis, the spacing between said tool holder means being greater than the width of the tire;
    g. a first, bead breaking tool carried on the first tool holder means for engaging said tire and said rim to separate a first bead of the tire from the rim when the feed means operates in a first direction;
    h. and a second, combined bead breaking and demounting tool carried on the second tool holder means for first separating a second bead of the tire from the rim, then drawing the tire into the drop center of the rim at a first location, and then demounting the tire from the rim at an opposite location when the feed means operates in a second direction;
    i. said combined tool comprising a first, bead breaking wheel, a second, demounting wheel, and means pivoted to the second tool holder means for supporting said wheels in lateral rotary contact with the tire adjacent the rim.

2. Apparatus according to claim 1 in which said bead breaking wheel is mounted for angular movement of its axis with respect to the last-named means.

3. A tire mounting and demounting unit including:
    a. a longitudinally extending mounting base;
    b. a tire rim mounting member arranged in generally horizontal overlying relation to said base and being rotatable with respect thereto;
    c. a generally vertical carrier element arranged for longitudinal movement on said base for shifting the same with respect to said rim mounting member;
    e. said carrier element including a vertically shiftable member;
    f. bead breaking elements mounted on said vertically shiftable member including an upper bead breaking element vertically and rotatably positioned on said shiftable member and a lower pair of bead breaking elements which upper element and said lower pair of bead breaking elements will engage the opposite beads of a tire mounted on said tire mounting rim;
    g. a mounting shaft extending from said vertically shiftable member;
    h. a mounting bar arranged on said shaft;
    i. said lower pair of bead breaking elements being arranged for rotation on the respective ends of said bar; and,
    j. means for shifting said vertically shiftable member to bring said bead elements into contact with the tire for breaking the bead thereof from the rim.

4. The structure set forth in claim 3 and said lower set of bead breaking elements including a pair of dish shaped members.

5. The structure set forth in claim 4 and one of said bead breaking elements being rotatably mounted on said bar to permit rotation thereof about a generally horizontal axis.

6. The structure set forth in claim 3 and said mounting bar being offset angularly from said mounting shaft at an angle other than normal.

7. The structure set forth in claim 6 and said mounting bar being arranged for rotation on said shaft.

8. The structure set forth in claim 7 and stop means arranged to control the rotation of said bar on said shaft.

* * * * *